United States Patent
Kang et al.

(10) Patent No.: US 8,345,735 B2
(45) Date of Patent: Jan. 1, 2013

(54) MODULATION AND DEMODULATION APPARATUS USING FREQUENCY SELECTIVE BASEBAND AND TRANSMISSION AND RECEPTION APPARATUS USING THE SAME

(75) Inventors: Tae Wook Kang, Daejeon (KR); In Gi Lim, Daejeon (KR); Hyung Il Park, Daejeon (KR); Sung Weon Kang, Daejeon (KR); Kyung Soo Kim, Daejeon (KR); Sung Eun Kim, Seoul (KR); Jung Bum Kim, Daejeon (KR); Jin Kyung Kim, Daejeon (KR); Chang Hee Hyoung, Daejeon (KR); Jung Hwan Hwang, Daejeon (KR); Ki Hyuk Park, Daejeon (KR); Jae Hoon Shim, Daejeon (KR); Hey Jin Myoung, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 326 days.

(21) Appl. No.: 12/918,030

(22) PCT Filed: Oct. 24, 2008

(86) PCT No.: PCT/KR2008/006314
§ 371 (c)(1),
(2), (4) Date: Aug. 17, 2010

(87) PCT Pub. No.: WO2009/113759
PCT Pub. Date: Sep. 17, 2009

(65) Prior Publication Data
US 2010/0322290 A1    Dec. 23, 2010

(30) Foreign Application Priority Data
Mar. 11, 2008 (KR) ........................ 10-2008-0022509

(51) Int. Cl.
*H04B 3/46* (2006.01)
(52) U.S. Cl. ........................................................ 375/224
(58) Field of Classification Search .................. 375/219, 375/224, 295, 316
See application file for complete search history.

(56) References Cited

U.S. PATENT DOCUMENTS
6,307,850 B1 * 10/2001 Watanabe ..................... 370/335
(Continued)

FOREIGN PATENT DOCUMENTS
JP           11-234188 A       8/1999
(Continued)

OTHER PUBLICATIONS

T.G. Zimmerman, "Personal Area Networks: Near-field intrabody communication", IBM Systems Journal, 1996, pp. 609-617, vol. 35, Nos. 3&4, IBM.

(Continued)

*Primary Examiner* — Jaison Joseph

(57) ABSTRACT

There is provided a communication method using a human body as a medium. A modulation apparatus using a frequency selective baseband according to an aspect of the invention may include: a serial-to-parallel conversion unit converting serial data supplied from an upper layer into parallel data consisting of M+1 number of data input bits; and a frequency selective spreader selecting one subgroup among a plurality of subgroups obtained by dividing $2^N$ number (where N is a positive integer) of spreading codes used for frequency spreading by $2^M$ (where M is a positive integer, and M<N is satisfied), and selecting and outputting one spreading code among $2^M$ number of spreading codes of the one subgroup by using the M number of data input bits, and spreading codes obtained by performing bit circular shifts on the $2^M$ number of spreading codes. Accordingly, the number of transmission data is increased to improve a transmission data rate, strong interference induced from users and other electronic devices is reduced, and stable human body communication having low power consumption is performed.

18 Claims, 8 Drawing Sheets

U.S. PATENT DOCUMENTS

| | | |
|---|---|---|
| 6,400,755 B1 | 6/2002 | Harris et al. |
| 7,171,177 B2 * | 1/2007 | Park et al. ............... 455/188.1 |
| 2004/0146116 A1 * | 7/2004 | Kang et al. ............... 375/260 |
| 2004/0174812 A1 | 9/2004 | Murakami et al. |
| 2005/0249264 A1 | 11/2005 | Suzuki et al. |
| 2010/0074257 A1 * | 3/2010 | Lim ............... 370/392 |
| 2011/0007844 A1 * | 1/2011 | Park et al. ............... 375/302 |

FOREIGN PATENT DOCUMENTS

| | | |
|---|---|---|
| JP | 2004-229269 A | 8/2004 |
| KR | 1020010102879 A | 11/2001 |
| WO | WO 2004/070981 A1 | 8/2004 |

OTHER PUBLICATIONS

International Search Report for PCT/KR2008/006314 filed Oct. 24, 2008.

Written Opinion of the International Searching Authority for PCT/KR2008/006314 filed Oct. 24, 2008.

* cited by examiner

Fig. 3

SUBGROUP 0 ($W_0 \sim W_{15}$)

| | |
|---|---|
| W0  | 0000000000000000000000000000000000000000000000000000000000000000 |
| W1  | 0000000000000000000000000000000011111111111111111111111111111111 |
| W2  | 0000000000000000111111111111111111111111111111110000000000000000 |
| W3  | 0000000000000000111111111111111100000000000000001111111111111111 |
| W4  | 0000000011111111111111110000000000000000111111111111111100000000 |
| W5  | 0000000011111111111111110000000011111111000000000000000011111111 |
| W6  | 0000000011111111000000001111111111111111000000001111111100000000 |
| W7  | 0000000011111111000000001111111100000000111111110000000011111111 |
| W8  | 0000111111110000000011111111000000001111111100000000111111110000 |
| W9  | 0000111111110000000011111111000011110000000011111111000000001111 |
| W10 | 0000111111110000111100000000111111110000000011110000111111110000 |
| W11 | 0000111111110000111100000000111100001111111100001110000000001111 |
| W12 | 0000111100001111111100001110000000001110000111111110000111110000 |
| W13 | 0000111100001111111100001110000111100011110000000011110000111111 |
| W14 | 0000111100001110000111100001111111100001110000111100001111110000 |
| W15 | 0000111100001110000111100001110000111100001110000111100001111111 |

Fig. 4

SUBGROUP 1 ($W_{16} \sim W_{31}$)

| W16 | 0011110000111100001111000011110000111100001111000011110000111100 |
|---|---|
| W17 | 0011110000111100001111000011110011000011110000111100001111000011 |
| W18 | 0011110000111100110000111100001111000011110000110011110000111100 |
| W19 | 0011110000111100110000111100001100111100001111001100001111000011 |
| W20 | 0011110011000011110000110011110000111100110000111100001100111100 |
| W21 | 0011110011000011110000110011110011000011001111000011110011000011 |
| W22 | 0011110011000011001111001100001111000011001111001100001100111100 |
| W23 | 0011110011000011001111001100001100111100110000110011110011000011 |
| W24 | 0011001111001100001100111100110000110011110011000011001111001100 |
| W25 | 0011001111001100001100111100110011001100001100111100110000110011 |
| W26 | 0011001111001100110011000011001111001100001100110011001111001100 |
| W27 | 0011001111001100110011000011001100110011110011001100110000110011 |
| W28 | 0011001100110011110011001100100001100110011001111001100110011001100 |
| W29 | 0011001100110011110011001100110011001100110011000011001100110011 |
| W30 | 0011001100110011001100110011110011001100110011001100110011001100 |
| W31 | 0011001100110011001100110011001100110011001100110011001100110011 |

Fig. 5

SUBGROUP 2 ($W_{32}$~$W_{47}$)

| W32 | 0110011001100110011001100110011001100110011001100110011001100110 |
| W33 | 0110011001100110011001100110011010011001100110011001100110011001 |
| W34 | 0110011001100110100110011001100110011001100110010110011001100110 |
| W35 | 0110011001100110100110011001100101100110011001101001100110011001 |
| W36 | 0110011010011001100110010110011001100110100110011001100101100110 |
| W37 | 0110011010011001100110010110011010011001011001100110011010011001 |
| W38 | 0110011010011001011001101001100110011001011001101001100101100110 |
| W39 | 0110011010011001011001101001100101100110100110010110011010011001 |
| W40 | 0110100110010110011010011001011001101001100101100110100100010110 |
| W41 | 0110100110010110011010011001011010010110011010011001011001101001 |
| W42 | 0110100110010110100101100110100110010110011010010110100100010110 |
| W43 | 0110100110010110100101100110100101010010010110100101100101101001 |
| W44 | 0110100101101001100101101001011001101001011010011001011010010110 |
| W45 | 0110100101101001100101101001011010010110100101100110100101101001 |
| W46 | 0110100101101001011010010110100110010110100101101001011010010110 |
| W47 | 0110100101101001011010010110100101101001011010010110100101101001 |

Fig. 6

SUBGROUP 3 ($W_{48} \sim W_{63}$)

| W48 | 0101101001011010010110100101101001011010010110100101101001011010 |
|---|---|
| W49 | 0101101001011010010110100101101010010110100101101001011010010101 |
| W50 | 0101101001011010101001011010010110100101101001010101101001011010 |
| W51 | 0101101001011010101001011010010101011010010110101010010110100101 |
| W52 | 0101101010100101101001010101101001011010101001011010010101011010 |
| W53 | 0101101010100101101001010101101010100101010110100101101010100101 |
| W54 | 0101101010100101010110101010010110100101010110101010010101011010 |
| W55 | 0101101010100101010110101010010101011010101001010101101010100101 |
| W56 | 0101010110101010010101011010101001010101101010100101010110101010 |
| W57 | 0101010110101010010101011010101010101001010101101010101001010101 |
| W58 | 0101010110101010101010010101011010101001010101010101010110101010 |
| W59 | 0101010110101010101010010101010101010110101010101010101001010101 |
| W60 | 0101010101010110101010101010100101010101010101101010101010101010 |
| W61 | 0101010101010110101010101010101010101010101010100101010101010101 |
| W62 | 0101010101010101010101010101010110101010101010101010101010101010 |
| W63 | 0101010101010101010101010101010101010101010101010101010101010101 |

MODULATION AND DEMODULATION APPARATUS USING FREQUENCY SELECTIVE BASEBAND AND TRANSMISSION AND RECEPTION APPARATUS USING THE SAME

TECHNICAL FIELD

The present invention relates to modulation and demodulation apparatuses using a frequency selective baseband, and transmission and reception apparatuses using the same, and more particularly, to a modulation and demodulation apparatus avoiding a frequency band from DC to 5 MHz within which noise power around the body is concentrated as compared with a different frequency band, and using a limited frequency baseband that is a frequency band within which a signal, transmitted through a human body serving as a waveguide, has much greater strength than a signal radiated to the outside of the body and a transmission and reception apparatus using the same.

This work was supported by the IT R&D program of MIC/IITA [2006-S-072-02: Controller SoC for Human Body Communications].

BACKGROUND ART

A human body communication technology exchanges signals between devices connected to a human body by using the human body having conductivity as a communication channel. A user s touch allows network communications between various kinds of portable devices, such as personal digital assistants (PDAs), portable personal computers, digital cameras, MP3 players, and cellular phones, and network communications between a user and fixed devices, such as printers, TVs, and door entry systems.

Currently, examples of a human body communication method may include a technique using a limited passband, scrambling using a unique user identification (ID), channel coding, interleaving, and spreading.

However, the human body communication methods use a passband having an intermediate frequency (fc), which is used by most of the communication systems, in order to use a limited frequency band. Therefore, the communication systems require an analog transceiver including a digital-to-analog converter, an analog-to-digital converter, an intermediate frequency converter, and the like, which increases power consumption.

Further, the current human body communication methods are inefficient due to a limited frequency band that is used to obtain a processing gain in a time domain/frequency domain spreading method because this makes it difficult to increase a data transmission rate and achieve stable data transmission and reception.

DISCLOSURE OF INVENTION

Technical Problem

An aspect of the present invention provides a modulation and demodulation apparatus using a frequency selective baseband and a transmission and reception apparatus using the same that can improve frequency selection, increase a processing gain, and increase a transmission data rate by using a transmission technique using a frequency selective baseband or a technique using a frequency selective spreading code.

An aspect of the present invention also provides a modulation and demodulation apparatus using a frequency selective baseband and a transmission and reception apparatus using the same that can prevent users from interfering with each other in a multi-user environment, implement stable communication even when strong interference is induced by other electronic devices, use a limited frequency band, and consume less power.

Technical Solution

According to an aspect of the present invention, there is provided a frequency selective spreader having an improved transmission data rate, including: an N-bit counter outputting n number of data input bits (where n is a positive integer); a subtracter receiving M number of data input bits (where M is a positive integer, and M<N is satisfied), N−M number of frequency selection control bits, and an offset input bit to select a desired frequency band; N−1 number of first XOR operation units performing gray indexing of the N−M number of frequency selection control bits and the M number of data input bits; N number of AND operation units respectively performing AND operations of an output of the N-bit counter, the N−M number of frequency selection control bits, and bits output from the N−1 number of first XOR operators; a second XOR operator performing an XOR operation of outputs of the N number of AND operation units; a bit circular delay unit performing a bit circular shift on an output of the second XOR operation unit; and a multiplexer selecting one between the output of the second XOR operation unit and an output obtained by performing the bit circular shift on the output of the second XOR operation unit, and outputting the selected output.

The frequency selective spreader may receive M+1 number of data input bits.

The bit circular delay unit may perform circular shifts on $2^N$ number of spreading codes, which are the output of the second XOR operation unit, so as to increase the number of bits of transmission data.

The multiplexer may select one between the output of the second XOR operation unit and the output of the bit circular delay unit on the basis of additional one input bit of the M+1 number of data input bits.

According to another aspect of the present invention, there is provided a modulation apparatus using a frequency selective baseband, the apparatus including: a serial-to-parallel conversion unit converting serial data supplied from an upper layer into parallel data consisting of M+1 number of data input bits; and a frequency selective spreader selecting one subgroup among a plurality of subgroups obtained by dividing $2^N$ number (where N is a positive integer) of spreading codes used for frequency spreading by $2^M$ (where M is a positive integer, and M<N is satisfied), and selecting and outputting one spreading code among $2^M$ number of spreading codes of the one subgroup by using the M number of data input bits, and spreading codes obtained by performing bit circular shifts on the $2^M$ number of spreading codes.

The frequency selective spreader may select one spreading code corresponding to an index value of the M number of data input bits, and select another spreading code between the one spreading code and a spreading code obtained by performing a bit circular shift on the one spreading code by using additional one bit so as to increase the number of bits of the transmission data.

The frequency selective spreader may give an offset as an input parameter to index values of the $2^M$ number of spreading codes of the selected one subgroup to select a desired frequency band from the entire spread frequency band.

The frequency selective spreader may include: an N-bit counter outputting N number of input data bits; a subtracter receiving M number of data input bits, N-M number of frequency selection control bits, and an offset input bit; N−1 number of first XOR operation units performing gray-indexing of the N−M number of frequency selection control bits and the M number of data input bits; N number of AND operation units respectively performing AND operations of an output of the N-bit counter, the N−M number of frequency selection control bits, and bits output from the N−1 number of first XOR operation units; a second XOR operation unit performing an XOR operation of outputs of the N number of AND operation units; a bit circular delay unit performing a circular shift of one bit position on an output of the second XOR operation unit; and a multiplexer selecting one between the output of the second XOR operation unit and an output obtained by performing the circular shift of one bit position on the output of the second XOR operation unit.

The multiplexer may select an output bit by using one additional input bit from the M+1 number of data input bits so as to increase the number of bits of transmission data.

According to still another aspect of the present invention, there is provided a demodulation apparatus using a frequency selective baseband, the apparatus including: a frequency selective despreader calculating, when transmission data demodulated in a transmission side is received, correlation values between the transmission data and spreading codes of one subgroup used during the modulation from a plurality of subgroups obtained by dividing $2^N$ number (where N is a positive integer) of spreading codes used for frequency spreading by $2^M$ (where M is a positive integer, and M<N is satisfied), and spreading codes obtained by performing circular shifts on the spreading codes, detecting a spreading code selected when the transmission data is demodulated, obtaining an index value of the detected spreading code, and outputting M+1-bit parallel data corresponding to the index value; and a parallel-to-serial conversion unit converting the M+1-bit parallel data into serial data.

The frequency selective spreader may output the M+1-bit parallel data corresponding to the index value of a spreading code having the largest correlation value among the correlation values.

According to yet another aspect of the present invention, there is provided a transmission apparatus using a modulation apparatus using a frequency selective baseband, the apparatus including: a preamble and header generation unit generating a preamble for frame synchronization and a header containing control information about data to be transmitted; a data generation unit outputting serial data as the data to be transmitted; a scrambling unit scrambling the serial data output from the data generation unit; a frequency selective modulation unit selecting one subgroup among a plurality of subgroups obtained by dividing $2^N$ number (where N is a positive integer) of spreading codes used for frequency spreading by $2^M$ (where M is a positive integer, and M<N is satisfied), and selecting and outputting one spreading code among $2^M$ number of spreading codes of the selected one subgroup, and spreading codes obtained by performing bit circular shifts on the 2M number of spreading codes; and a multiplexer multiplexing the generated preamble and the header, and the selected one spreading code into a digital signal, and outputting the digital signal.

The preamble and header generation unit may include: a preamble generator set by a default value in order to acquire frame synchronization, and generating a preamble having a predetermined length; a header generator creating a header containing control information about the data to be transmitted in a predetermined header format; an HCS generator generating the data in the header format into a header check sequence (HCS); and a spreader spreading the generated preamble and header.

The frequency modulation unit may include: a serial-to-parallel conversion unit converting serial data output from the data generation unit into parallel data consisting of M+1 number of data input bits; and a frequency selective spreader selecting one subgroup among a plurality of subgroups obtained by dividing $2^N$ number of spreading codes used for frequency spreading by $2^M$, and selecting and outputting one spreading code among $2^M$ number of spreading codes of the selected one subgroup by using the M+1 number of data input bits, and spreading codes obtained by performing bit circular shifts on the $2^M$ number of spreading codes.

The frequency selective spreader may select one spreading code corresponding to an index value of the M number of data input bits, and select one between the one spreading code and a spreading code obtained by performing a bit circular shift on the one spreading code by using additional one bit so as to increase the number of bits of the transmission data.

According to another aspect of the present invention, there is provided a reception apparatus using a demodulation apparatus using a frequency selective baseband, the apparatus including: a frame synchronization unit detecting a preamble from transmission data transmitted from a transmission side, and performing frame synchronization; a demultiplexer separating and outputting header and data from the transmission data according to the frame synchronization; a header processing unit despreading the separated header, and then restoring control information about the data by verifying a header check sequence (HCS); a frequency selective demodulation unit calculating correlation values between the separated data and spreading codes of one subgroup used during the modulation from a plurality of subgroups obtained by dividing $2^N$ number (where N is a positive integer) of spreading codes used for frequency spreading by $2^M$ (where M is a positive integer, and M<N is satisfied), and spreading codes obtained by performing circular shifts on the spreading codes, obtaining an index value of the spreading code determined to be selected when the transmission data is demodulated, and outputting M+1-bit parallel data corresponding to the index value into serial data; a descrambling unit descrambling the serial data into an orthogonal code; and a data processing unit processing the descrambled data.

The reception apparatus may further include an analog processing unit compensating timing synchronization and frequency offset by noise reduction of the transmission data, signal amplification, clock recovery, and data alignment before the frame synchronization.

The frequency selective modulation unit may include: a frequency selective despreader calculating correlation values between the transmission data and spreading codes of one subgroup used during the modulation among a plurality of subgroups obtained by dividing $2^N$ number of spreading codes used for frequency spreading by $2^M$, and spreading codes obtained by performing circular shifts on the spreading codes, detecting a spreading code corresponding to the largest correlation value as the spreading code selected when the transmission data is demodulated, obtaining an index value of the detected spreading code, and outputting M+1-bit parallel data corresponding to the index value; and a parallel-to-serial conversion unit converting the M+1-bit parallel data into serial data and outputting the serial data.

Advantageous Effects

As set forth above, according to the exemplary embodiment of the invention, serial-to-parallel conversion, frequency selective baseband transmission, and a limited number of frequency selective spreading codes are used in digital communication, such that a processing gain of the entire system can be increased, external noise can be effectively reduced, a transmission data rate can be effectively increased.

Further, according to the exemplary embodiment of the invention, by using a frequency selective baseband transmission method selecting and using spreading codes in a user s desired frequency band, the complexity of an analog transceiver is reduced to thereby reduce power consumption of the entire digital communication system.

BRIEF DESCRIPTION OF THE DRAWINGS

FIGS. 3 to 6 are exemplary views sequentially illustrating subgroups of sixty four Walsh codes according to an exemplary embodiment of the invention;

BEST MODE FOR CARRYING OUT THE INVENTION

Figure 1:
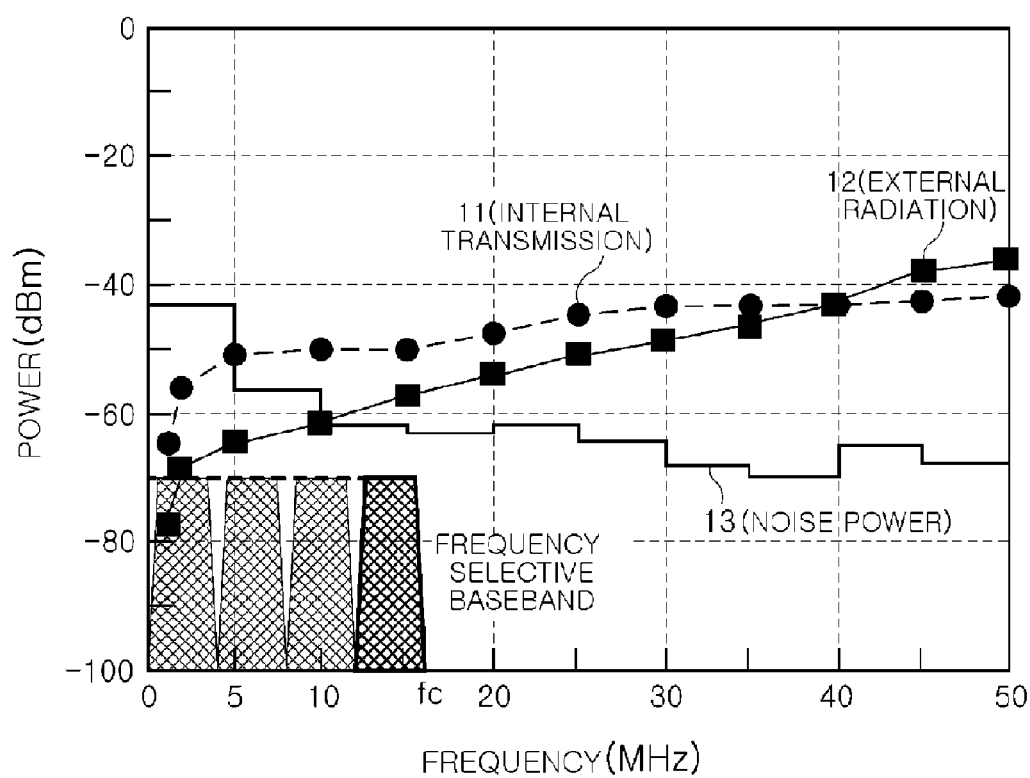
FIG. 1 is a graph illustrating the relationship between a frequency selective baseband for human body communication, and power of a signal transmitted into the body, external radiation power, and noise power around the body by frequencies according to an exemplary embodiment of the invention.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art.

Also, like reference numerals refer to like elements throughout the specification.

Hereinafter, exemplary embodiments of the present invention will now be described in detail with reference to the accompanying drawings. However, in description of operation principles associated with the embodiments of the present invention, detailed description of a known art or configuration is omitted because it may obscure the spirit of the present invention unnecessarily. In the following description, well-known functions or configurations are not described in detail since they would obscure the invention in unnecessary detail.

Also, in the drawings, the same reference numerals are used throughout to designate the same or similar components.

A modulation and demodulation apparatus using a frequency selective baseband and a transmission and reception using the same according to an embodiment of the invention can be applied to a digital communication system, in particular, to a human body communication system using a human body as a medium. In the embodiment of the invention, a description of the modulation and demodulation apparatus and the transmission and reception applied to the human body communication system will be made.

FIG. 1 is a graph illustrating the relationship between a frequency selective baseband for human body communication, and power of a signal transmitted into the body, external radiation power, and noise power around the body by frequencies according to an exemplary embodiment of the invention.

As shown in FIG. 1, power 11 of a signal transmitted into the body is dominant over power 12 of a signal radiated outside the body when a frequency band, which is used for the human body communication, is in a range from 0 to 40 MHz. On the contrary, in a frequency band of more than 40 MHz, the external radiation power 12 is greater than the internal transmission power 11.

Noise power 13 is obtained by adding results of measuring interference signals induced in various measurement locations, and averaging the added value every 5 MHz. The noise power 13 is greater than the signal power in a frequency band of 0 to 5 MHz.

Therefore, in the embodiment of the invention, a frequency selective baseband is used for data transmission within a frequency band of 5 to 40 MHz except for a frequency band from 0 to 5 MHz where the maximum noise power is shown and a frequency band of more than 40 MHz.

Here, a transmission technique using a frequency selective baseband only uses spreading codes having dominant frequency characteristics in a user's desired frequency band, among all of the spreading codes used for a processing gain of data. Therefore, the transmission technique using a frequency selective baseband performs baseband transmission to provide a simplified configuration of an analog transceiver, and acquire both desired frequency band and processing gain.

In the embodiment of the invention, sixty four Walsh codes are used as spreading codes for the selection of the frequency band, as shown in FIG. 1. The sixty four Walsh codes are obtained by dividing a frequency band of 0 to 16 MHz into six four frequency bands. Most dominant frequencies (fd) are sequentially given to the respective sixty four Walsh codes.

Here, the sixty four Walsh codes are divided into four subgroups, and a subgroup of Walsh codes using the maximum frequency band is selected, such that frequency selective baseband transmission using a desired frequency band can be performed.

Figure 7:
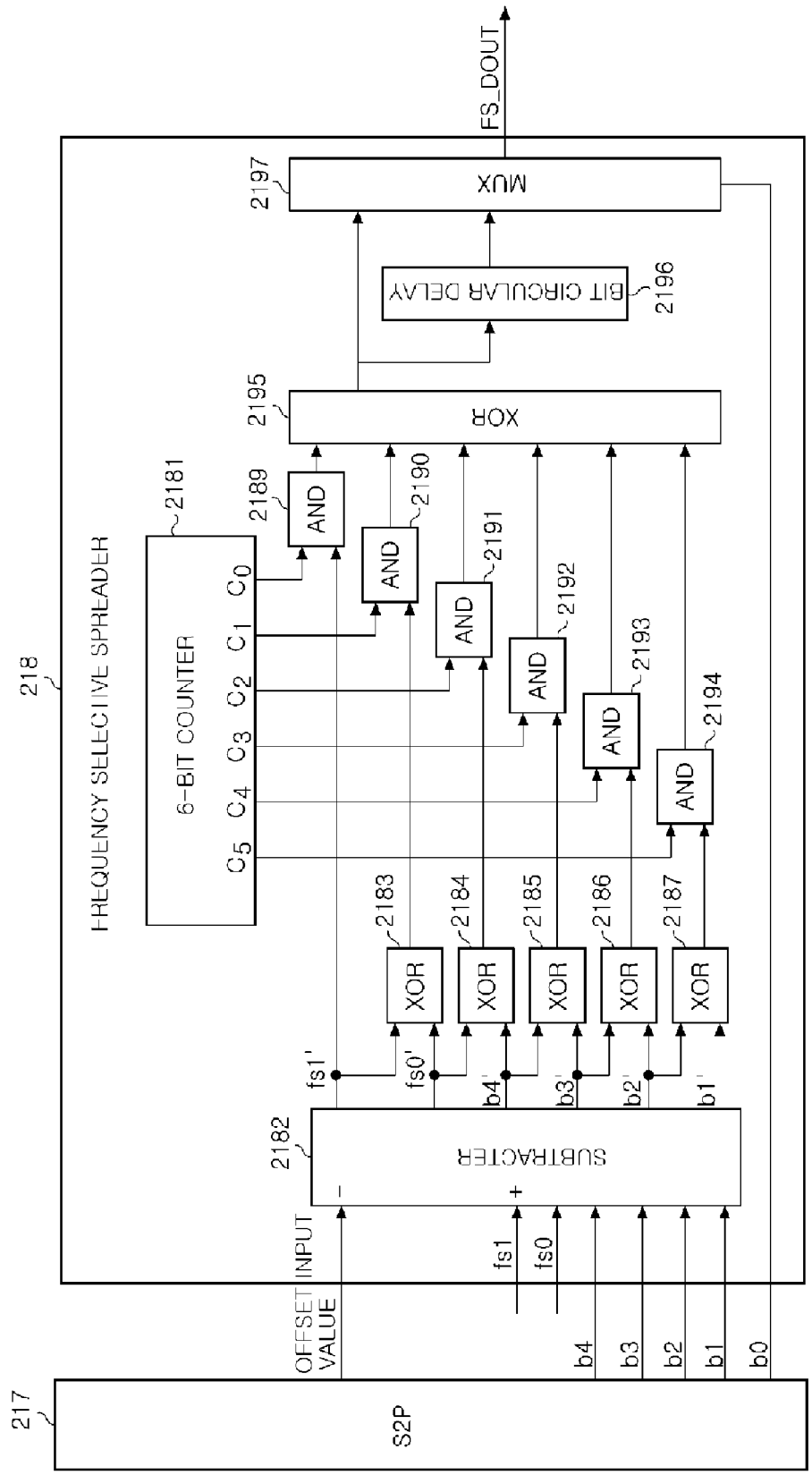
FIG. 7 is a configuration view illustrating a frequency selective spreader for human body communication that has an improved data transmission rate according to an exemplary embodiment of the invention.

Further, in the embodiment of the invention, the subgroup can be selected by applying an offset to a Walsh code index. For example, when a subgroup 3 is selected (where fs0=1 and fs1=1 are fixed), if the offset is 1, that is, if a subtracter 2182, shown in FIG. 7, is −1, Walsh code index values 62 to 47 are selected.

However, the above-described frequency selective spreading codes are not limited to the Walsh codes each of which consists of sixty four bits. A Walsh code consisting of $2^N$ (where N is a positive integer) number of bits may be used as the frequency selective spreading code.

Figure 2:
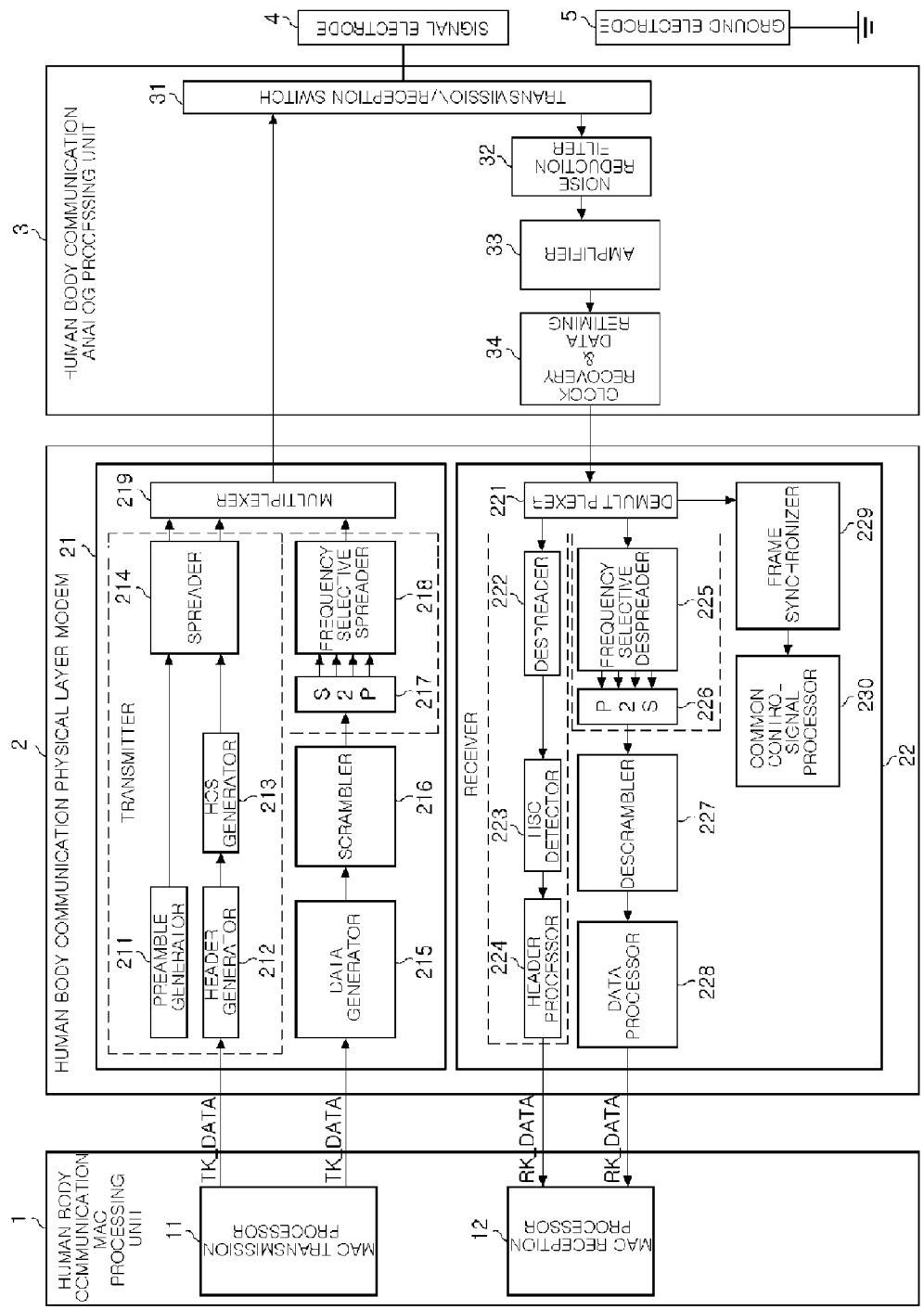
FIG. 2 is a configuration view illustrating a human body communication system using a frequency selective baseband according to an exemplary embodiment of the invention.

FIG. 2 is a configuration view illustrating a human body communication system using a modulation and demodulation apparatus using a frequency selective baseband according to an exemplary embodiment of the invention.

As shown in FIG. 2, a human body communication system includes a human body communication MAC processing unit 1, a human body communication physical layer modem 2, a human body communication analog processing unit 3, a signal electrode 4, and a ground electrode 5. Here, the human body communication physical layer modem 2 and the human body communication analog processing unit 3 are an example of the transmission and reception apparatus that uses a modulation and demodulation apparatus using a frequency selective baseband according to the embodiment of the invention.

A MAC transmission processor 11 of the human body communication MAC processing unit 1 processes data to be transmitted, received from an upper layer, and control information about the data, and transmits the processed data and control information to a transmitter 21 in the human body communication physical layer modem 2. A MAC reception processor 12 receives and processes the data and the control information about the data that are received by a receiver 22 of the human body communication physical layer modem 2, and then transmits the processed data and control information to the upper layer.

The human body communication physical layer modem 2 includes the transmitter 21 and the receiver 22 that use the modulation and demodulation apparatus using a frequency selective baseband.

The transmitter 21 includes a preamble generator 211, a header generator 212, a data generator 215, an HCS generator 213, a spreader 214, a scrambler 216, a modulation part including a serial-to-parallel converter 217 and a frequency selective spreader 218, and a multiplexer 219.

The preamble generator 211 is set to a default value that every user knows, and generates a preamble having a predetermined length.

The spreader 214 receives the preamble generated by the preamble generator 211, and spreads the preamble to obtain predetermined spreading codes.

The header generator 212 receives the control information (including a transmission rate, a modulation method, a user ID, and a data length) about the data that is transmitted from the human body communication MAC processing unit 1, and creates a header in a predetermined header format.

The HCS generator 213 generates a header check sequence (HCS) with respect to the header in the predetermined header format. Then, the spreader 214 spreads the header check sequence, generated by the HCS generator 213, to obtain the predetermined spreading codes.

The data generator 215 receives the data transmitted by the MAC transmission processor 11, and outputs the data at a desired time.

The scrambler 216 that is initialized by the user ID outputs an orthogonal code. Data scrambling is performed by an XOR operation between the orthogonal code and the data output from the data generator 215.

On the assumption that the serial-to-parallel converter (S2P) 217 uses sixty four Walsh codes, the serial-to-parallel converter 217 receives the scrambled data, and performs a five-bit serial-to-parallel conversion.

The serial-to-parallel conversion results in a reduction of the frequency baseband, used in the embodiment of the invention, by ⅕. As a result, a large amount of data can be transmitted within the same frequency band or high-quality data can be transmitted since a large processing gain of the spreading code can be obtained within the same frequency band.

The frequency selective spreader 218 receives an output consisting of five bits in parallel that are output from the serial-to-parallel converter 217, modulates the five-bit output into a one-bit frequency selective spreading code, and outputs the demodulated transmission data.

The multiplexer 219 outputs the preamble, the header, and the modulated transmission data according to a frame configuration. The signal electrode 4 receives the preamble, the header, and the modulated transmission data that are output by the multiplexer 219 through a transmission/reception switch 31 of the human body communication analog processing unit 3, and transmits the preamble, the header, and the modulated transmission data through the body. The ground electrode 5 has baseline potential like the ground of each of the transmitter 21 and the receiver 22 of the human body communication physical layer modem 2.

Therefore, the use of the frequency selective spreader, proposed in the embodiment of the invention, allows baseband transmission using a desired frequency band, and digital direction transmission with one-bit output. Further, data can be transmitted into the body by using the transmission/reception switch 31 and the signal electrode 4 without using an additional analog transmitter including a digital-to-analog converter, an intermediate frequency converter, and the like.

The operation of the receiver 22 of the human body communication physical layer modem 2 will now be described. Here, it is assumed that the frequency selection control bits used in the transmitter and the offset input value are previously known in the receiver 22.

A reception signal that is input by the signal electrode 4 passes through the transmission/reception switch 31. Then, the reception signal passes through a noise reduction filter 32 in order to remove from the reception signal, noise added to the reduction signal when the signal is transmitted into the body. Further, an amplifier 33 increases the amplitude of the reception signal to a desired level.

The amplified reception signal is input to a clock recovery and data retiming (CDR) 34. The CDR 34 compensates timing synchronization between the reception signal and a clock of a reception side and frequency offset of the reception signal. Output of the CDR 34, that is, the reception signal with the compensated timing synchronization and frequency offset is input to the receiver 22 of the human body communication physical layer modem 2.

Before frame synchronization, the signal that is input to the receiver 22 is input to a frame synchronizer 229. The frame synchronizer 229 performs frame synchronization using the preamble.

After the frame synchronization is acquired by the frame synchronizer 229, a demultiplexer 221 in the receiver 22 separates a header and data from the reception signal, and outputs the separated header and data.

The header passes through a despreader 222 and an HSC detector 223. A header processor 224 extracts control information about data of the reception signal, and transmits the extracted control information to the MAC reception processor 12.

The data of the output from the demultiplexer 221 is input to a demodulation part using a frequency selective baseband. The demodulation part includes a frequency selective despreader 225 and a parallel-to-serial converter (P2S) 226.

The frequency selective despreader 225 that receives the data output from the demultiplexer 221 calculates correlation values between the data and sixteen spreading codes that are frequency-selectively used in the transmitter 21 and another sixteen spreading codes obtained by performing circular shifts of one bit position on the sixteen spreading among the sixty four spreading codes, that is, thirty two Walsh codes by using a correlator (not shown). Then, the frequency selective despreader 225 outputs five data bits corresponding to an index value of a spreading code of the largest correlation value among the correlation values. Here, instead of calculating the correlation values between the data and the thirty two Walsh codes that are input from the frequency selective despreader 225, a maximum likelihood (ML) detection method may be used. However, a detailed description thereof will be omitted.

The output data consisting of five bits are input to the parallel-to-serial converter (P2S) 226. The P2S 226 then converts the five-bit parallel data into serial data. The serial data is input to the descrambler 227. Then, the serial output is descrambled into an orthogonal code that is output by an orthogonal code generator (not shown) that is initialized by the user ID extracted from the header. The descrambled reception data is input to a data processor 228. The data processor 228 processes the data, and transmits the processed data to the MAC reception processor 12.

FIGS. 3 to 6 are configuration views sequentially illustrating subgroups 0 to 3 of sixty-four bit Walsh codes according to an exemplary embodiment of the invention.

In the embodiment of the invention, as shown in FIGS. 3 to 6, when sixty four Walsh codes are used as spreading codes, and are divided into four subgroups, a subgroup 0 includes sixteen Walsh codes $W_0$ to $W_{15}$, a subgroup 1 includes sixteen Walsh codes $W_{16}$ to $W_{31}$, a subgroup 2 includes sixteen Walsh codes $W_{32}$ to $W_{47}$, and subgroup 3 includes sixteen Walsh codes $W_{48}$ to $W_{63}$.

Here, a usable frequency band is equally divided into sixty four frequency bands, and most dominant frequencies (fd) of the respective sixty four Walsh codes $W_0$ to $W_{63}$ are sequentially mapped onto the divided frequency bands.

For example, on the assumption that a spread frequency band of the total Walsh codes is 16 MHz, each one of the Walsh codes has a 16 MHz/64 dominant frequency fd interval, that is, a 250 KHz frequency interval.

Therefore, the Welsh code $W_0$ has a dominant frequency fd of 0 Hz, the Welsh code $W_1$ has a dominant frequency fd of 250 KHz, the $W_{48}$ has a dominant frequency fd of 12 MHz, and the Welsh code $W_{63}$ has a dominant frequency fd of 15.75 MHz.

In this embodiment, the subgroup 3 including the Welsh codes $W_{48}$ to $W_{63}$ is selected, and the Walsh codes that are respectively allocated to the most dominant frequencies fd within a frequency band of 12 to 15.75 MHz from the entire frequency band of 16 MHz, are used.

FIG. 7 is a detailed view illustrating a configuration of a frequency selective spreader according to the embodiment of the invention.

The frequency selective spreader 218 according to the embodiment of the invention receives (M+1)-bit input data. The frequency selective spreader 218 then selects one subgroup among a plurality of the subgroups obtained by dividing $2^n$ (where n is a positive integer) number of spreading codes by $2^M$ (where M is a positive integer, and M<N is satisfied) by using (N−M) bit frequency selection control bits and an offset input bit, and uses the selected subgroup for frequency spreading. In the embodiment of the invention, it is assumed that N=6 and M=4 are satisfied, and sixty four Walsh codes are used as spreading codes.

As shown in FIG. 7, the frequency selective spreader 218 includes a 6-bit counter 2181, and receives two-bit frequency selection control bits fs1 and fs0, and lower five-bit data input bits b4, b3, b2, b1, and b0, and one-bit output FS_DOUT.

Here, the two-bit frequency selection control bits fs1 and fs0 are set differently according to a selected subgroup. For example, in a case of the subgroup 1, the frequency selection control bits fs1 and fs0 are set to (0, 1), in a case of the subgroup 2, the frequency selection control bits fs1 and fs0 are set to (1, 0), in a case of the subgroup 3, the frequency selection control bits fs1 and fs0 are set to (1, 1).

Further, the frequency selective spreader 218 may give an offset by using a subtracter 2182 when selecting a Walsh code index. That is, the subtracter 2182 generates an output value according to the offset input value as follows: $fs1 fs0 b4 b3 b2 b1_{(2)}$-offset input value=$fs1' fs0' b4' b3' b2' b1'_{(2)}$.

Specifically, the two-bit frequency selection control bits fs1 and fs0 and the offset input value (four bits or less) are changed so that the output value ($fs1' fs0' b4' b3' b2' b1'_{(2)}$) or a range of the output value can be controlled. Walsh codes are selected according to the output value. Since the selected Walsh codes each have the dominant frequency band, a user's desired frequency band is selected.

Further, the frequency selective spreader 218 needs five XOR logic circuits 2183, 2184, 2185, 2186, and 2187 for gray indexing, six AND logic circuits 2189, 2190, 2191, 2192, 2193, and 2194, and an XOR logic circuit 2195. The AND logic circuits 2189, 2190, 2191, 2192, 2193, and 2194 receive outputs $C_5$ to $C_0$ of the 6-bit counter 2181, respectively, and the most significant bit fs1 of the frequency selection control bits, and output bits of the five XOR logic circuits, respectively. The XOR logic circuit 2195 performs an XOR operation of outputs of the six AND logic circuits.

On the assumption that the sixteen Walsh codes of the subgroup 3 ($W_{48}$ to $W_{63}$), shown in FIG. 6, are selected and used, the two-bit frequency selection control bits fs1 and fs0 are fixed to a value "11" from the six-bit input of the frequency selective spreader 218, and the subtracter 2182 that may apply an offset to the Walsh code index becomes 0. That is, sixteen Walsh codes $W_{48}$ to $W_{63}$ are output.

The final output generated from the XOR logic circuit 2195 satisfies the following equation:

$$\text{Equation} = (fs1' \text{ and } C_0) \text{xor} [(fs1' \text{ xor} fs0' \text{ and } C_1] \text{xor}$$
$$[(fs0' \text{xor} b4' \text{ and } C_2] \text{xor} [(b4' \text{xor} b3' \text{ and } C_3] \text{xor}$$
$$[(b3' \text{xor} b2' \text{ and } C_4] \text{xor} [(b2' \text{xor} b1' \text{ and } C_5]$$

A Walsh code, which is output from the XOR logic circuit 2195, and a Walsh code, which is obtained when the output Walsh code passes through the bit circular delay 2196 to perform a circular shift of one bit position on the Walsh codes, pass through a multiplexer 2197 that determines the one-bit output FS_DOUT by using the input data bit b0 that is additionally transmitted.

Here, thirty two spreading codes can be selected as the one-bit output FS_DOUT. Therefore, the frequency selective spreader 218 according to the embodiment of the invention can obtain a 25% increase in transmission rate gain over the existing method.

Figure 8:
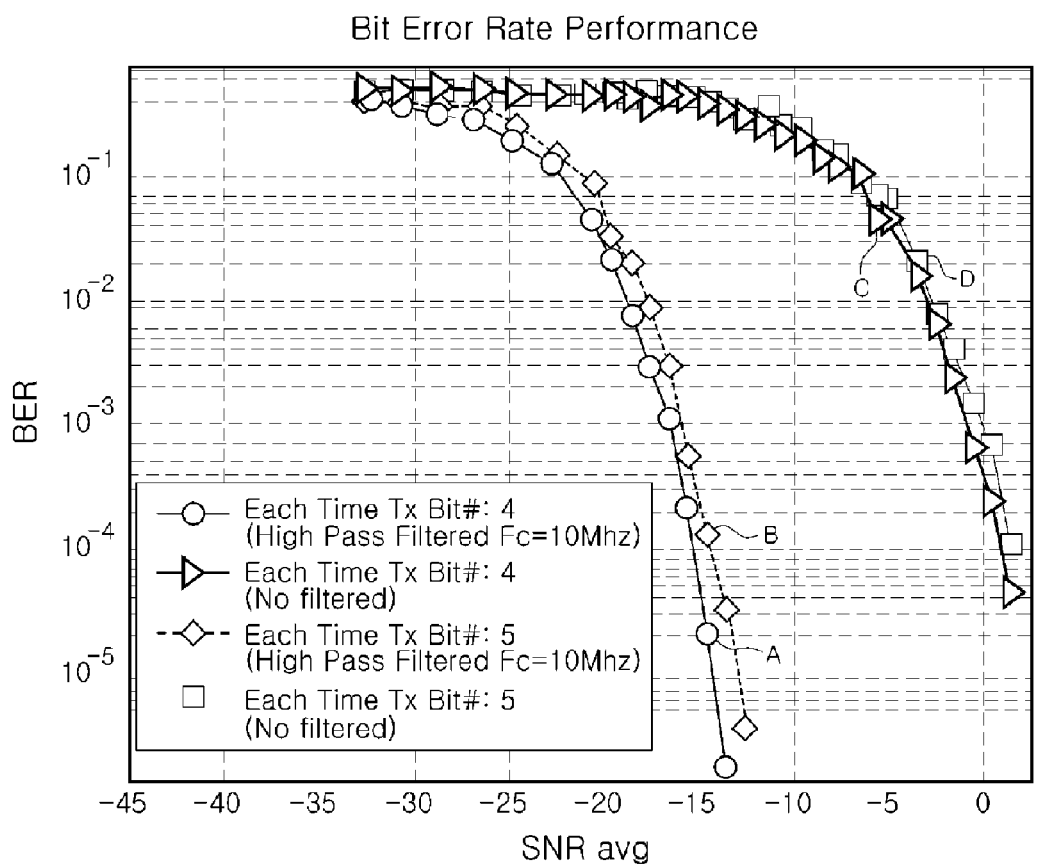
FIG. 8 is a graph illustrating a computer experiment result of a bit error rate in a frequency selective spreader according to an exemplary embodiment of the invention.

FIG. 8 is a graph illustrating a computer experiment result of a bit error rate in the frequency selective spreader according to the embodiment of the invention.

On the assumption that the sixteen Walsh codes $W_{48}$ to $W_{63}$ of the subgroup 3, shown in FIG. 6, are used, the two-bit frequency selection control bits fs1 and fs0 of the frequency selective spreader 218 are fixed to a value "11" from the six-bit input of the frequency selective spreader 218, and the subtracter 2182 that may apply an offset to the Walsh code index becomes 0.

As shown in FIG. 8, when a four-bit serial-to-parallel conversion is performed by using the existing sixteen Walsh codes, bit error rate performance is indicated by lines marked by circles A and triangles C, and when a five-bit serial-to-parallel conversion is performed by using sixteen Walsh codes and additional sixteen Walsh codes obtained by performing circular shifts of one bit position on the sixteen Walsh codes according to the embodiment of the invention, bit error rate performance is indicated by lines marked by diamonds B and rectangles D.

The lines A and C are formed when a high pass filter is used, and the lines B and D are obtained when the high pass filter is not used.

Therefore, the frequency selective spreader 218 according to the embodiment of the invention results in an increase in data transmission rate by 25%, and a deterioration in performance by about 1 dB at a bit error rate of 10 e-5. Here, the frequency selective spreader operates at the SNR when SNR_avg is 0.

While the present invention has been shown and described in connection with the exemplary embodiments, it will be apparent to those skilled in the art that modifications and variations can be made without departing from the spirit and scope of the invention as defined by the appended claims.

The invention claimed is:

1. A frequency selective spreader having an improved transmission data rate, comprising:
   an N-bit counter outputting n number of data input bits (where n is a positive integer);
   a subtracter receiving M number of data input bits (where M is a positive integer, and M<N is satisfied), N–M number of frequency selection control bits, and an offset input bit to select a desired frequency band;
   N–1 number of first XOR operation units performing gray indexing of the N–M number of frequency selection control bits and the M number of data input bits;
   N number of AND operation units respectively performing AND operations of an output of the N-bit counter, the N–M number of frequency selection control bits, and bits output from the N–1 number of first XOR operators;
   a second XOR operator performing an XOR operation of outputs of the N number of AND operation units;
   a bit circular delay unit performing a bit circular shift on an output of the second XOR operation unit; and
   a multiplexer selecting one between the output of the second XOR operation unit and an output obtained by performing the bit circular shift on the output of the second XOR operation unit, and outputting the selected output.

2. The frequency selective spreader of claim 1, wherein the frequency selective spreader receives M+1 number of data input bits.

3. The frequency selective spreader of claim 1, wherein the bit circular delay unit performs circular shifts on $2^N$ number of spreading codes, which are the output of the second XOR operation unit, so as to increase the number of bits of transmission data.

4. The frequency selective spreader of claim 2, wherein the multiplexer selects one between the output of the second XOR operation unit and the output of the bit circular delay unit on the basis of additional one input bit of the M+1 number of data input bits.

5. A modulation apparatus using a frequency selective baseband, the apparatus comprising:
   a serial-to-parallel conversion unit converting serial data supplied from an upper layer into parallel data consisting of M+1 number of data input bits; and
   a frequency selective spreader selecting one subgroup among a plurality of subgroups obtained by dividing $2^N$ number (where N is a positive integer) of spreading codes used for frequency spreading by $2^M$ (where M is a positive integer, and M<N is satisfied), and selecting and outputting one spreading code among $2^M$ number of spreading codes of the one subgroup by using the M number of data input bits, and spreading codes obtained by performing bit circular shifts on the $2^M$ number of spreading codes.

6. The modulation apparatus of claim 5, wherein the frequency selective spreader selects one spreading code corresponding to an index value of the M number of data input bits, and selects another spreading code between the one spreading code and a spreading code obtained by performing a bit circular shift on the one spreading code by using additional one bit so as to increase the number of bits of the transmission data.

7. The modulation apparatus of claim 5, wherein the frequency selective spreader gives an offset as an input parameter to index values of the $2^M$ number of spreading codes of the selected one subgroup to select a desired frequency band from the entire spread frequency band.

8. The modulation apparatus of claim 5, wherein the frequency selective spreader comprises:
   an N-bit counter outputting N number of input data bits;
   a subtracter receiving M number of data input bits, N–M number of frequency selection control bits, and an offset input bit;
   N–1 number of first XOR operation units performing gray-indexing of the N–M number of frequency selection control bits and the M number of data input bits;
   N number of AND operation units respectively performing AND operations of an output of the N-bit counter, the N–M number of frequency selection control bits, and bits output from the N–1 number of first XOR operation units;
   a second XOR operation unit performing an XOR operation of outputs of the N number of AND operation units;
   a bit circular delay unit performing a circular shift of one bit position on an output of the second XOR operation unit; and
   a multiplexer selecting one between the output of the second XOR operation unit and an output obtained by performing the circular shift of one bit position on the output of the second XOR operation unit.

9. The modulation apparatus of claim 8, wherein the multiplexer selects an output bit by using one additional input bit from the M+1 number of data input bits so as to increase the number of bits of transmission data.

10. A demodulation apparatus using a frequency selective baseband, the apparatus comprising:
    a frequency selective despreader calculating, when transmission data demodulated in a transmission side is received, correlation values between the transmission data and spreading codes of one subgroup used during the modulation from a plurality of subgroups obtained by dividing $2^N$ number (where N is a positive integer) of spreading codes used for frequency spreading by $2^M$ (where M is a positive integer, and M<N is satisfied), and spreading codes obtained by performing circular shifts on the spreading codes, detecting a spreading code selected when the transmission data is demodulated, obtaining an index value of the detected spreading code, and outputting M+1-bit parallel data corresponding to the index value; and
    a parallel-to-serial conversion unit converting the M+1-bit parallel data into serial data.

11. The demodulation apparatus of claim 10, wherein the frequency selective spreader outputs the M+1-bit parallel data corresponding to the index value of a spreading code having the largest correlation value among the correlation values.

12. A transmission apparatus using a modulation apparatus using a frequency selective baseband, the apparatus comprising:
    a preamble and header generation unit generating a preamble for frame synchronization and a header containing control information about data to be transmitted;

a data generation unit outputting serial data as the data to be transmitted;

a scrambling unit scrambling the serial data output from the data generation unit;

a frequency selective modulation unit selecting one subgroup among a plurality of subgroups obtained by dividing $2^N$ number (where N is a positive integer) of spreading codes used for frequency spreading by $2^M$ (where M is a positive integer, and M<N is satisfied), and selecting and outputting one spreading code among $2^M$ number of spreading codes of the selected one subgroup, and spreading codes obtained by performing bit circular shifts on the $2^M$ number of spreading codes; and a multiplexer multiplexing the generated preamble and the header, and the selected one spreading code into a digital signal, and outputting the digital signal.

13. The transmission apparatus of claim 12, wherein the preamble and header generation unit comprises:

a preamble generator set by a default value in order to acquire frame synchronization, and generating a preamble having a predetermined length;

a header generator creating a header containing control information about the data to be transmitted in a predetermined header format;

an HCS generator generating the data in the header format into a header check sequence (HCS); and a spreader spreading the generated preamble and header.

14. The transmission apparatus of claim 12, wherein the frequency modulation unit comprises:

a serial-to-parallel conversion unit converting serial data output from the data generation unit into parallel data consisting of M+1 number of data input bits; and a frequency selective spreader selecting one subgroup among a plurality of subgroups obtained by dividing $2^N$ number of spreading codes used for frequency spreading by $2^M$, and selecting and outputting one spreading code among $2^M$ number of spreading codes of the selected one subgroup by using the M+1 number of data input bits, and spreading codes obtained by performing bit circular shifts on the 2M number of spreading codes.

15. The transmission apparatus of claim 14, wherein the frequency selective spreader selects one spreading code corresponding to an index value of the M number of data input bits, and selects one between the one spreading code and a spreading code obtained by performing a bit circular shift on the one spreading code by using additional one bit so as to increase the number of bits of the transmission data.

16. A reception apparatus using a demodulation apparatus using a frequency selective baseband, the apparatus comprising:

a frame synchronization unit detecting a preamble from transmission data transmitted from a transmission side, and performing frame synchronization;

a demultiplexer separating and outputting header and data from the transmission data according to the frame synchronization;

a header processing unit despreading the separated header, and then restoring control information about the data by verifying a header check sequence (HCS);

a frequency selective demodulation unit calculating correlation values between the separated data and spreading codes of one subgroup used during the modulation from a plurality of subgroups obtained by dividing $2^N$ number (where N is a positive integer) of spreading codes used for frequency spreading by $2^M$ (where M is a positive integer, and M<N is satisfied), and spreading codes obtained by performing circular shifts on the spreading codes, obtaining an index value of the spreading code determined to be selected when the transmission data is demodulated, and outputting M+1-bit parallel data corresponding to the index value into serial data;

a descrambling unit descrambling the serial data into an orthogonal code; and a data processing unit processing the descrambled data.

17. The reception apparatus of claim 16, further comprising an analog processing unit compensating timing synchronization and frequency offset by noise reduction of the transmission data, signal amplification, clock recovery, and data alignment before the frame synchronization.

18. The reception apparatus of claim 16, wherein the frequency selective modulation unit comprises:

a frequency selective despreader calculating correlation values between the transmission data and spreading codes of one subgroup used during the modulation among a plurality of subgroups obtained by dividing $2^N$ number of spreading codes used for frequency spreading by $2^M$, and spreading codes obtained by performing circular shifts on the spreading codes, detecting a spreading code corresponding to the largest correlation value as the spreading code selected when the transmission data is demodulated, obtaining an index value of the detected spreading code, and outputting M+1-bit parallel data corresponding to the index value; and a parallel-to-serial conversion unit converting the M+1-bit parallel data into serial data and outputting the serial data.

* * * * *